United States Patent [19]

Dehrmann et al.

[11] Patent Number: 5,667,043
[45] Date of Patent: Sep. 16, 1997

[54] HYDRODYNAMIC TORQUE CONVERTER WITH LOCKUP CLUTCH

[75] Inventors: Uwe Dehrmann, Würzburg; Peter Volland, Rannungen; Hans-Wilhelm Wienholt, Dortmund, all of Germany

[73] Assignee: Fichtel & Sachs AG, Schweinfurt, Germany

[21] Appl. No.: 436,108

[22] Filed: May 8, 1995

[30] Foreign Application Priority Data

May 9, 1994 [DE] Germany .................. 44 16 153.0

[51] Int. Cl.⁶ .................. F16D 33/00; F16D 35/00; F16D 37/00
[52] U.S. Cl. ............ 192/3.29; 192/3.28; 192/113.36; 192/200
[58] Field of Search .................. 192/3.29, 3.28, 192/107 R, 113.3, 113.36, 200

[56] References Cited

U.S. PATENT DOCUMENTS

| | | |
|---|---|---|
| 4,194,604 | 3/1980 | Nichols et al. |
| 4,969,543 | 11/1990 | Macdonald . |
| 5,209,330 | 5/1993 | Macdonald . |
| 5,215,173 | 6/1993 | Gimmler . |
| 5,248,016 | 9/1993 | Umezawa . |
| 5,456,343 | 10/1995 | Murata et al. ............ 192/3.29 |
| 5,501,309 | 3/1996 | Walth et al. ............. 192/3.29 |
| 5,515,956 | 5/1996 | Schoder et al. .......... 192/3.29 |

FOREIGN PATENT DOCUMENTS

| | | |
|---|---|---|
| 0428248 | 5/1991 | European Pat. Off. . |
| 4121586 | 1/1993 | Germany . |
| 4425912 | 2/1995 | Germany . |
| 9313339 | 7/1993 | WIPO . |

*Primary Examiner*—Andrea L. Pitts
*Attorney, Agent, or Firm*—Nils H. Ljungman and Associates

[57] ABSTRACT

A hydrodynamic torque converter consists of a pump wheel driven by an internal combustion engine, a turbine wheel coupled to a drive shaft, and a stator which can be blocked in one direction of rotation. These wheels, together form a converter circuit filled with a hydraulic fluid, preferably oil, which interacts with a lock-up clutch. This lock-up clutch is located axially between the outside of the turbine wheel and the inside opposite it of the converter housing which forms the connection between the pump wheel and the internal combustion engine, and a piston which, like the converter housing, can also be driven preferably with some slip in relation to the corresponding friction lining, can be displaced axially and with the converter housing defines a chamber, which piston can be brought into contact by means of a first friction lining with a plate which is non-rotationally fastened to the turbine wheel, which plate is engaged for its part with its other side by means of a second friction lining with the converter housing. In the area of contact of the converter housing with the second friction lining there are channels for the flow of oil, which can carry the flow of oil on account of the pressure gradient between the turbine wheel and the chamber from radially outward to radially inward, while in the area of contact between the piston and the plate, a flow of oil into the chamber can at least be reduced.

20 Claims, 3 Drawing Sheets

HYDRODYNAMIC TORQUE CONVERTER WITH LOCKUP CLUTCH

BACKGROUND OF THE INVENTION

1. Field of the Invention

The present invention generally relates to a torque converter which includes a pump wheel driven by an internal combustion engine, a turbine wheel coupled to a drive shaft, and a stator which can be blocked in one direction of rotation, all of which together form a converter circuit filled with hydraulic fluid, preferably oil. The torque converter further includes a lock-up clutch which is located axially between the outside of the turbine wheel and the facing inner side of the converter housing which forms the connection between the pump wheel and the internal combustion engine. The torque converter also includes a piston which, like the converter housing, can also be driven preferably with some slip with respect to the corresponding friction lining. The piston can be displaced axially and, with the converter housing, defines a chamber. The piston can be brought into contact, by means of a first friction lining, with a plate which is non-rotationally fastened to the turbine wheel, which plate is engaged, for its part, with its other side by means of a second friction lining with the converter housing.

2. Background Information

Figure 3:
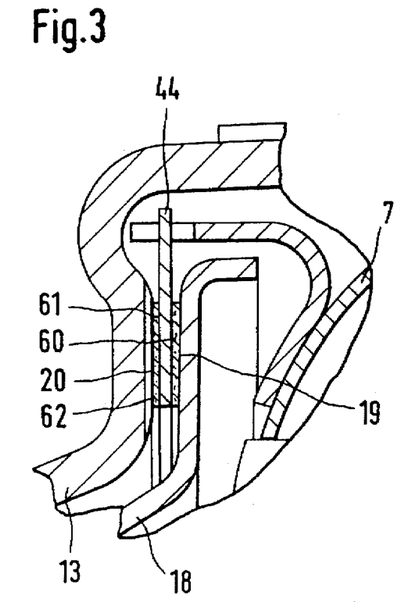
FIG. 3 is the same as FIG. 2, but with an additional channel in the friction lining facing the converter housing.
Figure 4:
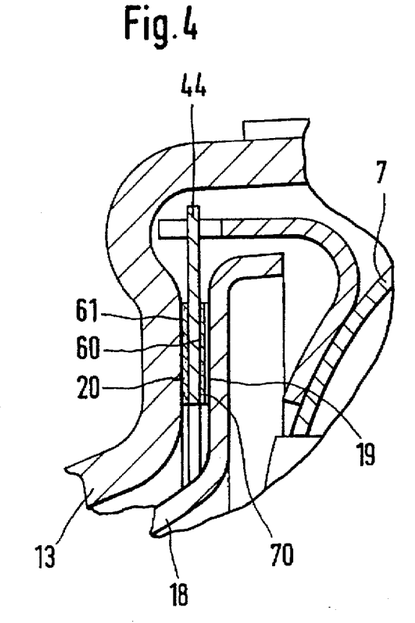
FIG. 4 is the same as FIG. 1 in the vicinity of the plate, but with channels in the friction lining facing the piston.

Such a torque converter is known and is disclosed, for example, by German Patent No. 41 21 586 A1, FIGS. 3 and 4. On account of the arrangement of the plate which is non-rotationally fastened to the turbine wheel between the piston and the converter housing, the number of friction surfaces is twice as high as in torque converters without this plate, which means that higher torques can be transmitted by means of the lock-up clutch. But while the piston, with its side facing the turbine wheel, is exposed to cooling oil, there is a risk that the converter housing, in the longitudinal area of the corresponding friction lining, will overheat on account of the insufficient access of an oil stream to the corresponding point of the converter housing, and will thereby be damaged. The risk of overheating occurs in particular if the converter housing and piston are deliberately moved with slip in relation to the corresponding friction lining to damp any vibrations which may occur.

European Patent No. 0 428 248 A2 discloses a known torque converter which has only one friction surface between the piston and the converter housing, in which this friction surface is designed with channels for the passage of oil, so that the oil can remove the heat which is generated when the piston is operated with a predetermined slip in relation to the converter housing. The channels are designed along the entire circumference of the friction lining, and run radially outward, starting from a connection opening to the converter circuit.

On the torque converter described immediately above, the piston, being disposed with respect to the converter housing, is also exposed to cooling oil, on its side facing away from the friction lining, so that on account of the presence of the channels carrying the oil flow in the friction lining, the temperatures on the piston and the converter housing can of course be reduced, but there remains an undesirable temperature difference between the two converter elements. An insufficiently strong oil flow in the channels would consequently lead to an overheating of the converter housing in the vicinity of the friction lining.

OBJECT OF THE INVENTION

The object of the present invention is to create a torque converter with a plate located between the piston of the lock-up clutch and the converter housing, and non-rotationally fastened to the turbine wheel, so that an overheating of the converter housing in the vicinity of the friction lining of the plate corresponding to the converter housing can be prevented.

SUMMARY OF THE INVENTION

The present invention teaches that this object can be accomplished by means of channels located between the converter housing and the plate, preferably in the area of contact of the converter housing with the second friction lining, which channels are for the flow of oil. Channels can carry the flow of oil essentially on account of the pressure gradient between the turbine wheel and the chamber from radially outward to radially inward, while between the piston and the plate, a flow of oil into the chamber can essentially at least be reduced.

By means of the feature of preferably designing the area of contact of the converter housing so that the corresponding friction lining can preferably have channels, while between the piston and the corresponding friction lining a flow of oil can essentially be at least reduced, the invention teaches that a majority of the oil flowing on account of the pressure gradient between the turbine wheel and the chamber can essentially flow through the channels between the converter housing and the corresponding friction lining, so that precisely at that point at which it is difficult to remove the heat generated during the operation of converter housing and piston with slip in relation to the corresponding friction lining, a significant cooling potential is essentially created on account of the capability of allowing a substantial amount of oil to flow, and thereby essentially preventing an overheating of the converter housing at the critical point. The friction lining facing the piston, on the other hand, can preferably be designed so that, since there is essentially no reason to fear an overheating of the piston on account of its large surface cooling from the turbine wheel side, the piston can preferably be cooled in the vicinity of its contact surface with the corresponding friction lining only by an essentially very small leak oil stream, for which purpose, small, capillary-like channels would preferably be used, or it may be preferable to completely do without any possibility for the flow of oil for the friction lining which faces the piston, so that essentially no cooling takes place at this point.

In a particular embodiment of the present invention, there can preferably be advantageous refinements of the area of contact between the converter housing and the corresponding friction lining, whereby the channels provided for the oil flow can preferably be located either on the friction lining, on the side of the converter housing facing the friction lining, or, if a particularly intense cooling is necessary, in both locations.

An advantageous feature of the present invention includes a method by which it is essentially possible to slightly cool the piston on its side facing the friction lining, preferably without thereby extracting a significant amount of the oil required for cooling from the other cooling point, namely the converter housing in the vicinity of the corresponding friction lining.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious, one with respect to the other.

One aspect of the invention resides broadly in a hydrokinetic lockup torque converter, such as for a motor vehicle, said torque converter comprising: a power input shaft defining an axis of rotation and an axial direction parallel to the axis of rotation; a power output shaft; a converter housing which has an apparatus for being driven by said power input shaft; a turbine wheel being disposed within the converter housing; the turbine wheel having a apparatus for being disposed on and for driving the power output shaft; a pump wheel being disposed adjacent the turbine wheel, the pump wheel having an apparatus for being fastened to the converter housing; a lockup clutch apparatus for coupling the turbine wheel to the converter housing; the lockup clutch apparatus having an engaged position wherein the turbine wheel is coupled to the converter housing; the lockup clutch apparatus having a disengaged position wherein the turbine wheel and the converter housing are uncoupled from one another; the lockup clutch apparatus comprising: a piston being disposed between the converter housing and the turbine wheel, the piston and the converter housing defining a first chamber therebetween; a second chamber having the pump wheel and the turbine wheel disposed therein; at least one friction lining being disposed between a portion of the converter housing and a portion of the piston; the at least one friction lining having an apparatus for contacting the converter housing and the piston in the engaged position of the lockup clutch apparatus; a passage for supplying and discharging converter fluid from the torque converter, the passage being disposed adjacent the power output shaft; a flow guide for connecting the first chamber to the passage; an apparatus for permitting flow of converter fluid from the second chamber into the first chamber in the engaged position of the lockup clutch apparatus; the apparatus for permitting flow being disposed adjacent the at least one friction lining; and the first chamber extending substantially between the apparatus for permitting flow and the flow guide.

Another aspect of the invention resides broadly in a hydrokinetic lockup torque converter, such as for a motor vehicle, the torque converter comprising: a power input shaft defining an axis of rotation and an axial direction parallel to the axis of rotation; a power output shaft; a converter housing, the converter housing having an apparatus for being driven by the power input shaft; a turbine wheel being disposed within the converter housing; the turbine wheel having an apparatus for being disposed on and for driving the power output shaft; a pump wheel being disposed adjacent the turbine wheel and having an apparatus for being fastened to the converter housing; a lockup clutch apparatus for coupling the turbine wheel to the converter housing; the lockup clutch apparatus having an engaged position wherein the turbine wheel is coupled to the converter housing; the lockup clutch apparatus having a disengaged position wherein the turbine wheel and the converter housing are uncoupled from one another; the lockup clutch apparatus comprising: a piston being disposed between the converter housing and the turbine wheel, the piston and the converter housing defining a first chamber therebetween; a second chamber having the pump wheel and the turbine wheel disposed therein; at least one friction lining being disposed between a portion of the converter housing and a portion of the piston; the at least one friction lining having an apparatus for contacting the converter housing and the piston in the engaged position of the lockup clutch means; a passage for supplying and discharging converter fluid from the torque converter, the passage being disposed adjacent the power output shaft; a flow guide for connecting the first chamber to the passage; an apparatus for permitting flow of converter fluid from the second chamber into the first chamber in the engaged position of the lockup clutch apparatus; the apparatus for permitting flow being disposed adjacent the at least one friction lining; and the first chamber extending substantially between the apparatus for permitting flow and the flow guide.

Yet another aspect of the invention resides broadly in a method of operating a hydrokinetic lockup torque converter, such as for a motor vehicle, the torque converter comprising: a power input shaft defining an axis of rotation and an axial direction parallel to the axis of rotation; a power output shaft; a converter housing, the converter housing having an apparatus for being driven by the power input shaft; a turbine wheel being disposed within the converter housing; the turbine wheel having an apparatus for being disposed on and for driving the power output shaft; a pump wheel being disposed adjacent the turbine wheel and having an apparatus for being fastened to the converter housing; a lockup clutch apparatus for coupling the turbine wheel to the converter housing; the lockup clutch apparatus having an engaged position wherein the turbine wheel is coupled to the converter housing; the lockup clutch apparatus having a disengaged position wherein the turbine wheel and the converter housing are uncoupled from one another; the lockup clutch apparatus comprising: a piston being disposed between the converter housing and the turbine wheel; the piston and the converter housing defining a first chamber therebetween; a second chamber having the pump wheel and the turbine wheel disposed therein; at least one friction lining being disposed between a portion of the converter housing and a portion of the piston; the at least one friction lining having means for contacting the converter housing and the piston in said engaged position of the lockup clutch apparatus; a passage for supplying and discharging converter fluid to and from the torque converter, the passage being disposed adjacent the power output shaft; a flow guide for connecting the first chamber to the passage; an apparatus for permitting flow of converter fluid from the second chamber into the first chamber in the engaged position of the lockup clutch apparatus; the apparatus for permitting flow being disposed adjacent the at least one friction lining; and the first chamber extending substantially between the apparatus for permitting flow and the flow guide; the method comprising the steps of: providing a power input shaft defining an axis of rotation and an axial direction parallel to the axis of rotation; providing a power output shaft; providing a converter housing, the converter housing having an apparatus for being driven by the power input shaft; providing a turbine wheel, the turbine wheel having an apparatus for being disposed on and for driving the power output shaft; providing a pump wheel, the pump wheel having an apparatus for being fastened to the converter housing; providing a lockup clutch apparatus for coupling the turbine wheel to the converter housing, the lockup clutch apparatus having an engaged position wherein the turbine wheel is coupled to the converter housing, and a disengaged position wherein the turbine wheel and the converter housing are uncoupled from one another; the step of providing the lockup clutch apparatus further comprises: providing a piston, the piston and the converter housing defining a first chamber therebetween; providing a second chamber; providing at least one friction lining, the at least one friction lining having an apparatus for contacting the converter housing and the piston in the engaged position of the lockup clutch apparatus; providing a passage for transporting converter fluid to and from the torque converter; providing a flow guide for connecting the first chamber to the passage; providing an apparatus for permitting flow of converter fluid from the second chamber into the first chamber in the engaged position of the lockup clutch apparatus; the method further comprising the steps of: disposing the turbine wheel within the converter housing and disposing the turbine wheel on the power output shaft with the apparatus for being disposed on and for driving of the turbine wheel; disposing the pump wheel adjacent the turbine wheel; disposing the piston between the converter housing and the turbine wheel; disposing the pump wheel and the turbine wheel within the second chamber; disposing the at least one friction lining between a portion of the converter housing and a portion of the piston; disposing the passage adjacent the power output shaft; connecting the first chamber to the passage with the flow guide; disposing the apparatus for permitting flow of converter fluid adjacent the at least one friction lining; configuring the first chamber to extend substantially between the apparatus for permitting and the flow guide; driving the converter housing with the power input shaft with the apparatus for being driven of the converter housing; transporting converter fluid to the torque converter and transporting converter fluid from the torque converter with the passage; driving the power output shaft with the apparatus for being disposed on and for driving of the turbine wheel; engaging and disengaging the turbine wheel and the converter housing with the lockup clutch apparatus; contacting the piston and the converter housing in the engaged position of the lockup clutch apparatus with the apparatus for contacting of the at least one friction lining; and permitting converter fluid to flow from the second chamber into the first chamber in the engaged position of the lockup clutch apparatus.

BRIEF DESCRIPTION OF THE DRAWINGS

The present invention is explained below in greater detail with reference to the embodiments illustrated in the accompanying drawings, in which.

DESCRIPTION OF THE PREFERRED EMBODIMENT

Figure 1:
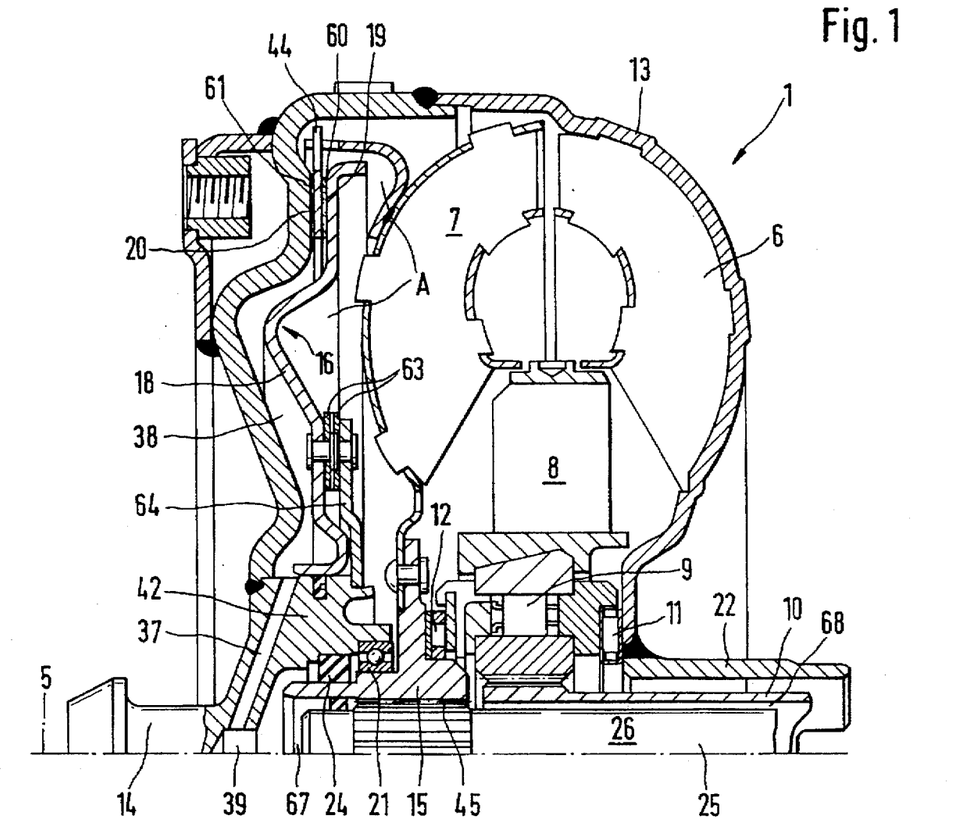
FIG. 1 shows the upper half of a longitudinal section through a torque converter with a lock-up clutch and plate between a piston and the converter housing.
Figure 1A:
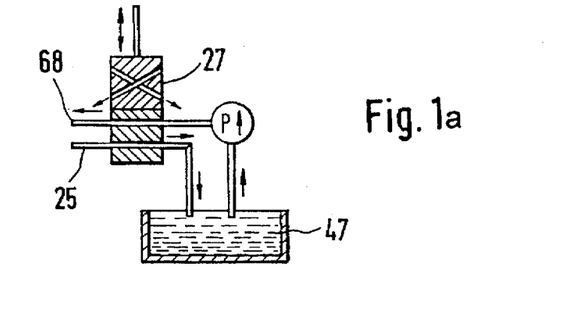
FIG. 1a shows the pump of the torque converter as shown in FIG. 1.
Figure 1B:
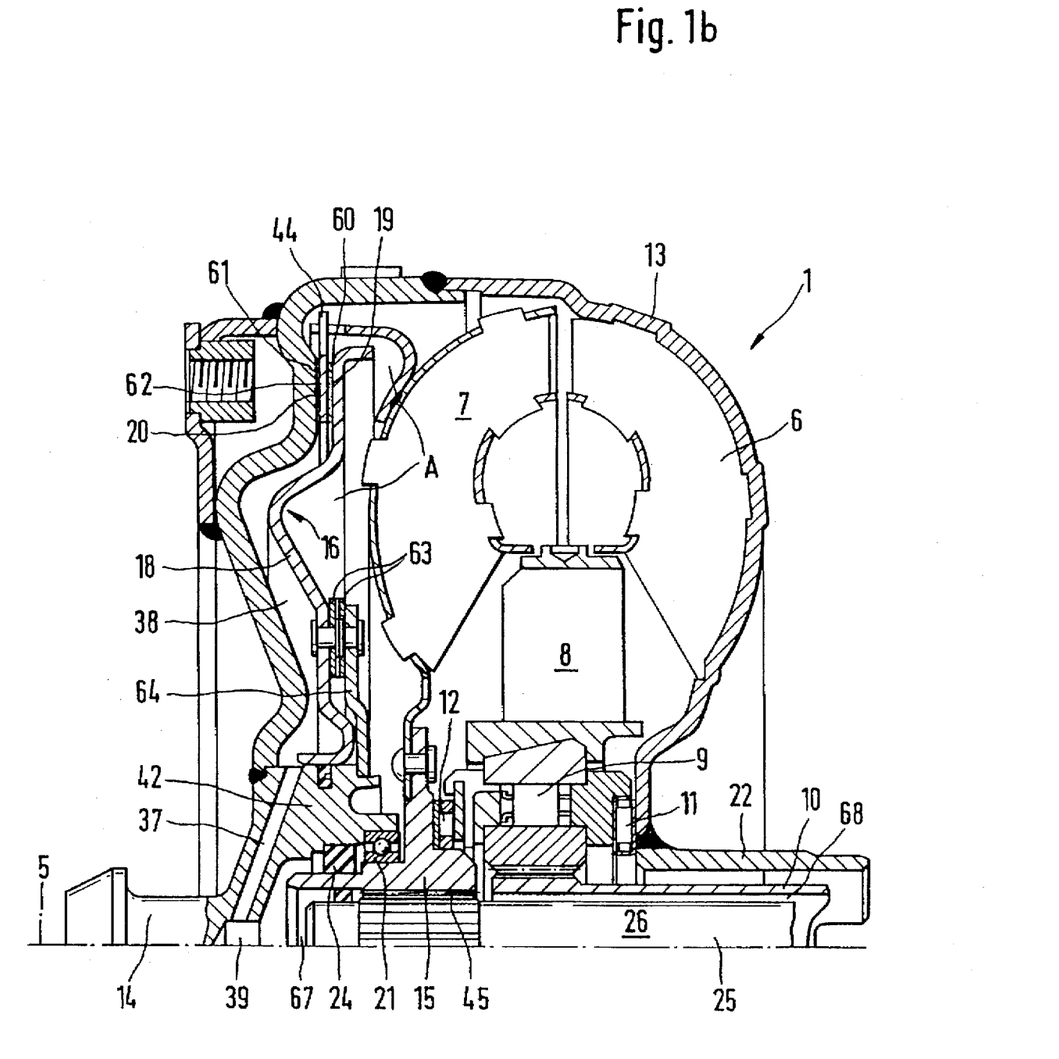
FIG. 1b shows the same view as shown in FIG. 1 with an additional element.

FIG. 1 illustrates a known hydrodynamic torque converter which includes a converter housing 13, which converter housing 13 can preferably be realized on the driven side as a pump wheel 6 and can preferably empty into a tube 22, which is preferably mounted in a transmission (not shown), and where it can preferably drive a pump P, which pump P can preferably supply the torque converter with hydraulic fluid, preferably oil. The converter housing 13 preferably encloses a lock-up clutch 16 which essentially includes the piston 18. In its outer circumference, this lock-up clutch 16 can preferably be designed so that it essentially has a radial area 19 which essentially runs parallel to a radial area 20 of the converter housing 13, whereby both areas are close up against one another. Between the converter housing 13 and the piston 18, there is preferably a plate 44 which, on its side facing the piston 18, has a first friction lining 60 and on its opposite side a second friction lining 61 facing the converter housing 13. The plate 44 can be brought, by means of the friction linings 60, 61, into an active connection with the areas 19 and 20 facing it, of the converter elements 13, 18. The friction lining 60 in this case is preferably designed with a solid and continuous surface on its side facing the area 19, while the friction lining 61, on its side facing the converter housing 13, is preferably designed with channels 62 which run radially, as shown in FIG. 1b.

In other words, in an embodiment of the present invention, the friction lining 61, which faces the converter housing 13, can preferably be designed with channels 62, whereas, the friction lining 60, which faces the radial area 19 adjacent piston 18, is designed preferably without such channels 62.

The plate 44 can preferably be extended radially outward beyond the piston 18, and there it can preferably be attached to the outer shell of a turbine wheel 7 non-rotationally, but so that it can essentially move axially. The piston 18 can preferably be mounted non-rotationally, but so that it can essentially move axially, on a support ring 42, which can preferably be designed as one piece with a bearing neck 14, which is preferably fastened to the converter housing 13, and is essentially guided in a crankshaft (not shown) of the internal combustion engine. The piston 18 can preferably be connected by means of leaf springs 63 to a ring plate 64, which can preferably be crimped with the support ring 42. By means of the leaf springs 63, a prestress of the piston 18 is essentially generated toward the converter housing 13.

The support ring 42 can preferably be located on its end pointing away from the internal combustion engine by means of a bearing 21 on a turbine hub 15 of the turbine wheel 7, and can preferably be sealed with respect to the turbine hub 15 by means of a seal or gasket 24. The turbine hub 15 can preferably be mounted directly by means of gear teeth 45 on a transmission-side drive shaft 26. This drive shaft 26 can preferably extend in the direction toward the internal combustion engine into the bearing neck 14, and has a longitudinal hole 25 which essentially empties on the driven side into the transmission and on the drive side into a space or chamber 67 which can preferably be designed on the bearing neck 14.

The tube 22 to drive the pump P essentially runs concentrically to the driven shaft 26, whereby in the radial space between them there can preferably be a support shaft 10 which can essentially support a free wheel or free-running hub 9 for the stator 8. The stator 8 can preferably be supported in the axial direction on both sides by means of respective bearing elements 11 and 12, namely with respect to the converter housing 13 on one hand and the turbine hub 15 on the other hand. The turbine hub 15 can preferably be supported axially by means of the bearing 21 with respect to the support ring 42 of the bearing neck 14.

All the rotating parts of the hydrodynamic torque converter are essentially oriented concentrically to the hub axis 5. In the bearing neck 14, there can preferably be a blind hole 39 of the space or chamber 67 which can preferably extend from the driven shaft 26, from which a flow guide or multiplicity of holes 37 can essentially run radially outward at an angle, and which can preferably extend into a chamber 38 designed between the piston 18 and the converter housing 13.

As shown in FIG. 1, a space A of the converter circuit can preferably be connected by means of a space 68 surrounded by the support shaft 10 with the pump P. The space 68 can lead from the pump P via the spaces of the bearing element 12 into the pump wheel 6. There is a reversing valve 27, as shown in FIG. 1a, between the longitudinal hole 25 and the space 68 of the pump P, or between a reservoir 47 for converter fluid or oil.

In other words, in an embodiment of the present invention, reversing valve 27 can preferably be located between the longitudinal hole 25 and the space 68, or, alternatively, reversing valve 27 can preferably be located between reservoir 47 and space 68.

The torque converter can preferably function as follows, in accordance with a preferred embodiment of the present invention:

In the illustrated position of the reversing valve 27, the fluid current can preferably be guided from the pump P directly into the space 68, as a result of which the fluid travels through the converter 1 into the space A. As a result, an overpressure occurs on the side of the piston 18 facing away from the converter housing 13, which overpressure essentially displaces the piston 18 toward the internal combustion engine, and thus can bring the piston 18 into contact on the converter housing 13 by means of the friction linings 60, 61. As a result, there is essentially a non-rotational connection, whereby the torque is essentially transmitted from the converter housing 13 via the piston 18 and the plate 44 to the turbine wheel 7, and via the gear teeth 45 of the turbine hub 15 directly to the driven shaft 26. The torque is thus transmitted directly, essentially bypassing the converter circuit.

A portion of the oil pressing the piston 18 against the converter housing 13 can preferably travel radially outward into the area of the plate 44, and under the action of the pressure difference from the chamber 38, can essentially flow radially inward through the channels 62 in the friction lining 61, as shown in FIG. 1b. On one hand, this essentially cools the friction lining 61, and on the other hand, it also essentially cools the area 20 of the converter housing 13, which is of particular importance if the converter housing 13 is operated with slip in relation to the friction lining 61. On the friction lining 60, on the other hand, since this friction lining is essentially in continuous surface contact with the area 19 of the piston 18, the oil is essentially prevented from travelling radially inward into the chamber 38.

In an embodiment of the present invention, therefore, since friction lining 60 is preferably designed without such channels 62 on the side facing the radial area 19 of the piston 18, oil is essentially prevented from travelling between friction lining 60 and piston 18. Therefore, the oil flow into chamber 38 is preferably made possible by the means for permitting flow of fluid or the channels 62 formed in friction lining 61.

After it flows into the chamber 38, the oil essentially travels through the holes 37 into the blind hole 39 of the chamber 67, and from there into the passage or longitudinal hole 25 of the driven shaft 26. The return flow in this longitudinal hole 25 into the reservoir 47, in which the oil can be cooled, can preferably take place unthrottled. In the second possible position of the reversing valve 27, the pump P can preferably be connected to the longitudinal hole 25, and the return can preferably be connected to the chamber 68. In this case, the full pressure of the fluid is essentially transmitted into the chamber 67, and via this chamber, through the flow guide or holes 37 into the chamber 38, as a result of which the piston 18 is essentially pushed to the right, with respect to FIG. 1, and loses its torque transmitting function.

Figure 2:
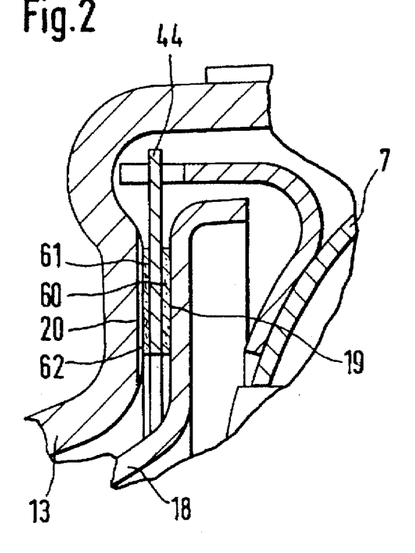
FIG. 2 shows a detail from FIG. 1, representing the area on both sides of the plate, but with a channel in the converter housing.

While the channels 62, as shown in FIG. 1b, are designed in the friction lining 61, these channels, as shown in FIG. 2, run in the converter housing 13 inside the longitudinal portion of the friction lining 61 on the side facing the friction lining 61. The operation in this case is essentially the same as if the channels 62 had been formed in the friction lining 61, so that at this point, the function of the unit will not be described in any further detail. It should be noted however, that when the channels 62 are located in the converter housing 13, the oil is essentially guided practically inside the object to be cooled, which means that the heat exchange is improved even further in comparison to the solution illustrated in FIG. 1b.

Possibly an even greater heat exchange can be achieved by means of the solution illustrated in FIG. 3, in which channels 62 can preferably be formed both in the friction lining 61 and in the converter housing 13, on the respective sides facing one another. As a result of this configuration, the amount of oil which can flow from radially outward into the chamber 38 is essentially particularly large. The cooling action which can be achieved is essentially correspondingly high.

As shown in FIG. 4, in an embodiment of the present invention, there is also the possibility of forming channels 70 between the friction lining 60 and the radial area 19 of the piston 18, through which channels 70 the oil coming from the pump wheel 6 can preferably flow from radially outside to radially inside into the chamber 38. As shown in FIG. 4, these channels 70 can preferably be designed in terms of their diameter so that they are very much smaller than the channels 62 which run between the plate 44 and the converter housing 13. The reason for this smaller diameter is essentially that the piston 18 is pressurized by oil anyway on its side facing the pump wheel 7, and therefore is not excessively heated, so that a piston cooling on the side facing the friction lining 60 is not essentially absolutely necessary. On account of the very narrow channels 70, only a weak cooling action is applied in this area, while by means of the channels 62 a comparatively strong cooling action is essentially generated on the converter housing 13.

In an embodiment of the present invention, channels 70 can preferably be formed in the piston 18 on its side facing friction lining 60, facing inside of the converter housing which forms the connection between the pump wheel and the internal combustion engine, and a piston which, like the converter housing, can also be driven preferably with some slip with respect to the corresponding friction lining, can be displaced axially and with the converter housing defines a chamber, which piston can be brought into contact by means of a first friction lining with a plate which is non-rotationally fastened to the turbine wheel, which plate is engaged for its part with its other side by means of a second friction lining with the converter housing, characterized by the fact that between the converter housing 13 and the plate 44, preferably in the area of contact of the converter housing 13 with the second friction lining 61 there are channels 62 for the flow of oil, which can carry the flow of oil on account of the pressure gradient between the turbine wheel 7 and the chamber 38 from radially outward to radially inward, while between the piston 18 and the plate 44, a flow of oil into the chamber 38 can at least be reduced.

Another feature of the invention resides broadly in the torque converter characterized by the fact that the channels 62 in the second friction lining 61 are formed on its side facing the converter housing 13.

Yet another feature of the invention resides broadly in the torque converter characterized by the fact that the channels 62 on the converter housing 13 are provided in the longitudinal portion of the second friction lining 61 on the side facing the converter housing 13.

Still another feature of the invention resides broadly in the torque converter characterized by the fact that in the second friction lining 61, on its side facing the converter housing 13, there are first channels 62, and on the converter housing 13, there are second channels 62 in the longitudinal portion of the second friction lining 61 on its side facing the converter housing 13.

A further feature of the invention resides broadly in the torque converter characterized by the fact that between the piston 18 and the plate 44 there are additional channels 70 for the flow of oil into the chamber 38, which with a maximum of the same number as the channels 62 between the converter housing 13 and the plate 44, have a significantly smaller cross section than the latter.

Types of torque converters and components therefor, which may be utilized in accordance with the embodiments of the present invention may be found in the following U.S. Pat. Nos. 4,478,323 to Weissenberger on Oct. 23, 1984, entitled "Hydrodynamic Clutch with Torsional Vibration Damping"; 4,437,551 to Gimmler on Mar. 20, 1984, entitled "Hydrodynamic Torque Converter"; 5,065,853 to Fujimoto et al. on Nov. 19, 1991, entitled "Lockup Clutch of Torque Converter"; 4,468,989 to Rosen on Sep. 4, 1984, entitled "Power Transmission Mechanism with a Hydrokinetic Torque Converter Having a Lockup Clutch"; No. 4,382,496 to Yamamori et al. on May 10, 1983, entitled "Torque Converter with Lockup Clutch Unit"; and 4,071,125 to Jameson on Jan. 31, 1978, entitled "Power Transmission with Torque Converter Lockup Clutch".

Additional types of torque converters which may be utilized in accordance with the present invention may be found in the following publications: German Laid Open Patent Applications DE-OS P 43 20 769.3 and DE-OS P 43 06 598.8 are hereby incorporated by reference as if set forth in their entirety herein.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 16 153.0, filed on May 9, 1994, having inventors Uwe Dehrmann, Peter Volland and Hans-Wilhelm Weinholt, and DE-OS P 44 16 153.0 and DE-PS P 44 16 153.0, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The foreign patent publication applications, namely, Federal Republic of Germany Patent Application Nos. P 43 43 804.0, filed on Dec. 22, 1993, and P 43 23 640.9, filed on Jul. 6, 1994, having inventors Uwe Dehrmann, Peter Volland, Wolfgang Kundermann, Hans Wilhelm Wienholt, Ruthard Knoblach, and Herbert Sckmid, and DE-OS P 43 43 804.0 and P 43 23 640.9 and P 43 43 804.0 and P 43 23 640.9, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A hydrokinetic lockup torque converter, said torque converter comprising:

a converter housing, said converter housing comprising an arrangement for being driven;

a turbine wheel being disposed within said converter housing;

said turbine wheel comprising an arrangement for being disposed on, and for driving, a shaft;

a pump wheel being disposed adjacent said turbine wheel, said pump wheel being fastened to said converter housing;

a lockup clutch for coupling said turbine wheel to said converter housing;

said lockup clutch having an engaged position wherein said turbine wheel is coupled to said converter housing;

said lockup clutch having a disengaged position wherein said turbine wheel and said converter housing are uncoupled from one another;

said lockup clutch comprising a piston;

said piston being disposed between said converter housing and said turbine wheel, said piston and said converter housing defining a first chamber therebetween;

a second chamber having said pump wheel and said turbine wheel disposed therein;

at least one friction lining being disposed between a portion of said converter housing and a portion of said piston;

said at least one friction lining comprising a first portion;

said first portion of said friction lining being disposed to contact said converter housing in the engaged position of said lockup clutch;

said at least one friction lining comprising a second portion;

said second portion of said friction lining being disposed to contact said piston in said engaged position of said lockup clutch;

at least one first channel disposed substantially adjacent said first portion of said at least one friction lining for permitting flow of converter fluid from said second chamber into said first chamber in the engaged position of said lockup clutch;

at least one second channel disposed substantially adjacent said second portion of said at least one friction lining for permitting flow of converter fluid from said second chamber into said first chamber in the engaged position of said lockup clutch; and said at least one first channel being dimensioned to permit a greater fluid flow than said at least one second channel.

2. The hydrokinetic lockup torque converter of claim 1 wherein said at least one first channel is dimensioned to have a total cross sectional area greater than said at least one second channel.

3. The hydrokinetic lockup torque converter of claim 2, wherein:

said at least one first channel is configured to permit fluid to flow in contact with said first portion of said at least one friction lining; and said at least one second channel is configured to permit fluid to flow in contact with said second portion of said at least one friction lining.

4. The hydrokinetic lockup torque converter of claim 3, wherein:

said at least one first channel is disposed in at least one of:
said first portion of said at least one friction lining; and
said portion of said converter housing adjacent said first portion of said at least one friction lining; and said at least one second channel is disposed in at least one of:
said second portion of said at least one friction lining; and
said portion of said piston adjacent said second portion of said at lease one friction lining.

5. The hydrokinetic lockup torque converter of claim 4 wherein:

said at least one friction lining comprises a first friction lining and a second friction lining;

said first friction lining comprises said first portion of said at least one friction lining;

said second friction lining comprises said second portion of said at least one friction lining;

said lockup clutch comprises a friction plate disposed between said portion of said converter housing and said portion of said piston;

said friction plate comprises a first side and a second side disposed to face opposite one another;

said first friction lining is fastened to said first side of said friction plate;

said second friction lining is fastened to said second side of said friction plate;

said lockup clutch comprises an arrangement for attaching said friction plate to a portion of said turbine wheel;

said at least one first channel comprises a plurality of first channels; and said at least one second channel comprises a plurality of second channels.

6. The hydrokinetic lockup torque converter of claim 5 wherein each of said plurality of first channels and each of said plurality of second channels extends substantially radially between said second chamber and said first chamber to permit said converter fluid to flow in said radial direction between said second chamber and said first chamber.

7. The hydrokinetic lockup torque converter of claim 6 wherein:

each of said plurality of first channels and each of said plurality of second channels comprises a first end and a second end;

each said first end is disposed at said second chamber;

each said second end is disposed at said first chamber;

said first friction lining and said second friction lining comprise an outer circumferential dimension and an inner circumferential dimension, said inner circumferential dimensions are disposed concentrically within said outer circumferential dimensions;

said outer circumferential dimensions are disposed substantially adjacent each said first end of said channels;

said inner circumferential dimensions are disposed substantially adjacent each said second end of said channels;

said second chamber comprises a portion disposed radially adjacent to said outer circumferential dimensions; and each said first end of each said channels is disposed to receive converter fluid from said portion of said second chamber in the engaged position of said lockup clutch.

8. The hydrokinetic lockup torque converter of claim 7 wherein:

said piston comprises an arrangement to move away from said converter housing into the disengaged position of said lockup clutch upon converter fluid flowing from a pump into said first chamber, and to move towards said housing into the engaged position of said lockup clutch upon converter fluid flowing from a pump into said second chamber;

said torque converter comprises a bearing ring disposed substantially concentrically about said axis of rotation and between said converter housing and said turbine wheel;

said arrangement for being driven comprises a bearing neck;

said bearing neck comprises means for being operatively attached to a crankshaft of an internal combustion engine;

said piston comprises an additional portion disposed radially inwardly from said portion of said piston;

said additional portion of said piston comprises means for fastening said piston to said bearing ring, said piston being fastened to said bearing ring at said additional portion;

said torque converter comprises a stator disposed between said turbine wheel and said pump wheel, said stator comprises a first side facing said turbine wheel and a second side facing said pump wheel;

said stator comprises a first bearing and a second bearing;

said first bearing is disposed at said first side of said stator and said second bearing is disposed at said second side of said stator;

said arrangement for being disposed on, and for driving, a shaft comprises a turbine hub for being disposed on a transmission shaft;

said turbine hub is disposed substantially adjacent said bearing ring;

said turbine hub comprises a plurality of gear teeth extending radially inwardly from said turbine hub for engaging a transmission shaft;

said bearing ring comprises a projection extending substantially parallel to said axis of rotation and towards said turbine wheel;

said torque converter comprises a third bearing disposed between said turbine hub and said bearing ring;

said torque converter comprises a ring plate having a first end and a second end disposed at a distance from said first end;

said first end of said ring plate is disposed on said projection of said bearing ring;

said second end of said ring plate comprises at least one leaf spring for permitting axial movement of said piston with respect to said portion of said converter housing;

said at least one leaf spring comprises a plurality of leaf springs, each of said plurality of leaf springs having a first end and second end;

said first ends of ones of said plurality of leaf springs are attached to said piston; and said second ends of ones of said plurality of leaf springs are attached to said ring plate.

9. The hydrokinetic lockup torque converter of claim 3, wherein:

said at least one first channel is disposed in said first portion of said at least one friction lining; and said at least one second channel is disposed in said second portion of said at least one friction lining.

10. The hydrokinetic lockup torque converter of claim 9, wherein:

said at least one first channel Comprises a plurality channels disposed in said first portion of said at least one friction lining; and said at least one second channel comprises a plurality of channels disposed in said second portion of said at least one friction lining.

11. The hydrokinetic lockup torque converter of claim 9, wherein:

said at least one friction lining comprises a first friction lining and a second friction lining;

said first friction lining comprises said first portion of said at least one friction lining; and said second friction lining comprises said second portion of said at least one friction lining.

12. The hydrokinetic lockup torque converter of claim 3, wherein:

said at least one first channel is disposed in said portion of said converter housing adjacent said first portion of said at least one friction lining; and said at least one second channel is disposed in said second portion of said at least one friction lining.

13. The hydrokinetic lockup torque converter of claim 12, wherein:

said at least one first channel comprises a plurality of channels disposed in said portion of said converter housing adjacent said first portion of said at least one friction lining; and said at least one second channel comprises a plurality of channels disposed in said second portion of said at least one friction lining.

14. The hydrokinetic lockup torque converter of claim 13, wherein:

said at least one friction lining comprises a first friction lining and a second friction lining;

said first friction lining comprises said first portion of said at least one friction lining; and said second friction lining comprises said second portion of said at least one friction lining.

15. The hydrokinetic lockup torque converter of claim 3, wherein:

said at least one first channel is disposed in said first portion of said at least one friction lining; and said at least one second channel is disposed in said portion of said piston adjacent said second portion of said at least one friction lining.

16. The hydrokinetic lockup torque converter of claim 15, wherein:

said at least one first channel comprises a plurality of channels disposed in said first portion of said at least one friction lining; and said at least one second channel comprises a plurality of channels disposed in said portion Of said piston adjacent said second portion of said at least one friction lining.

17. The hydrokinetic lockup torque converter of claim 16, wherein:

said at least one friction lining comprises a first friction lining and a second friction lining;

said first friction lining comprises said first portion of said at least one friction lining; and said second friction lining comprises said second portion of said at least one friction lining.

18. The hydrokinetic lockup torque converter of claim 3, wherein:

said at least one first channel is disposed in said portion of said converter housing adjacent said first portion of said at least one friction lining; and said at least one second channel is disposed in said portion of said piston adjacent said second portion of said at least one friction lining.

19. The hydrokinetic lockup torque converter of claim 18, wherein:

said at least one first channel comprises a plurality of channels disposed in said portion of said converter housing adjacent said first portion of said at least one friction lining; and said at least one second channel comprises a plurality of channels disposed in said portion of said piston adjacent said second portion of said at least one friction lining.

20. The hydrokinetic lockup torque converter of claim 19, wherein:

said at least one friction lining comprises a first friction lining and a second friction lining;

said first friction lining comprises said first portion of said at least one friction lining; and said second friction lining comprises said second portion of said at least one friction lining.

* * * * *

UNITED STATES PATENT AND TRADEMARK OFFICE
CERTIFICATE OF CORRECTION

PATENT NO. : 5,667,043
DATED : September 16, 1997
INVENTOR(S) : Uwe DEHRMANN, Peter VOLLAND and Hans-Wilhelm WIENHOLT It is certified that error appears in the above-identified patent and that said Letters Patent is hereby corrected as shown below:

In column 8, line 44, after 'wheel', delete "7," and insert --6,--.

In column 8, line 53, after '60.' insert the following, beginning a new paragraph:

--One feature of the invention resides broadly in the hydrodynamic torque converter including a pump wheel driven by an internal combustion engine, a turbine wheel coupled to a drive shaft, a stator which can be blocked in one direction of rotation, all of which together form a converter circuit filled with hydraulic fluid, preferably oil, a lock-up clutch which is located axially between the outside of the turbine wheel and the--.

In column 10, line 15, after 'Herbert', delete "Sckmid," and insert --Schmid,--.

UNITED STATES PATENT AND TRADEMARK OFFICE
CERTIFICATE OF CORRECTION

PATENT NO. : 5,667,043

DATED : September 16, 1997

INVENTOR(S) : Uwe DEHRMANN, Peter VOLLAND and Hans-Wilhelm WIENHOLT

It is certified that error appears in the above-identified patent and that said Letters Patent is hereby corrected as shown below:

In column 11, line 43, Claim 4, after 'at', delete "lease" and insert --least--.

Signed and Sealed this

Third Day of February, 1998

Attest:

BRUCE LEHMAN

Attesting Officer

Commissioner of Patents and Trademarks